A. E. JONES.
TURBINE DRIVE OF GYROSCOPIC STEERING GEARS OF TORPEDOES.
APPLICATION FILED NOV. 18, 1908.

954,634.

Patented Apr. 12, 1910.
2 SHEETS—SHEET 1.

A. E. JONES.
TURBINE DRIVE OF GYROSCOPIC STEERING GEARS OF TORPEDOES.
APPLICATION FILED NOV. 18, 1908.

954,634.

Patented Apr. 12, 1910.
2 SHEETS—SHEET 1.

Witnesses:
Geo. Heinicke
F. Dittmar

Inventor:
Albert Edward Jones
by G. Dittmar
Attorney

UNITED STATES PATENT OFFICE.

ALBERT EDWARD JONES, OF FIUME, AUSTRIA-HUNGARY.

TURBINE-DRIVE OF GYROSCOPIC STEERING-GEARS OF TORPEDOES.

954,634.	Specification of Letters Patent.	Patented Apr. 12, 1910.

Application filed November 18, 1908. Serial No. 463,213.

*To all whom it may concern:*

Be it known that I, ALBERT EDWARD JONES, subject of His Majesty the King of Great Britain, residing at Fiume, in the Kingdom of Austria-Hungary, have invented certain new and useful Improvements in Turbine-Drives of Gyroscopic Steering-Gears of Torpedoes, of which the following is a specification, reference being had therein to the accompanying drawing.

This invention relates to turbine drives of gyroscope steering gears.

It is well known that in side steering gears of torpedoes based upon the free axis principle of a cardanically suspended fly wheel, the latter is held in a certain normal position and set in very rapid rotation during the launching. To convert the axis of the fly wheel held fast at the moment of launching into a free axis, the system of gyroscope rings must be released at the end of the launching. If the fly wheel is formed by a turbine wheel driven by compressed air, it is necessary that at the moment of releasing the gyroscopic system, the compressed air is cut off as otherwise the jet of compressed air might have a diverting effect upon the released fly wheel. Hence, in compressed air driven gyroscopes after launching it becomes not only essential to bring back the members holding fast the gyroscope system from their operative into their preliminary position, but the compressed air channels leading to the driving nozzles also in view of avoiding loss of air must also be cut off.

My invention has for its object to provide a special device whereby after a certain lapse of time after the opening of the air lever, the compressed air channel leading to the turbine drive can be closed and the said retaining devices drawn back into their inoperative position. And in order that my invention may be more fully understood I have caused to be appended hereunto two sheets of drawings marked with characters of reference indicating like parts in the various figures.

Figure 1:
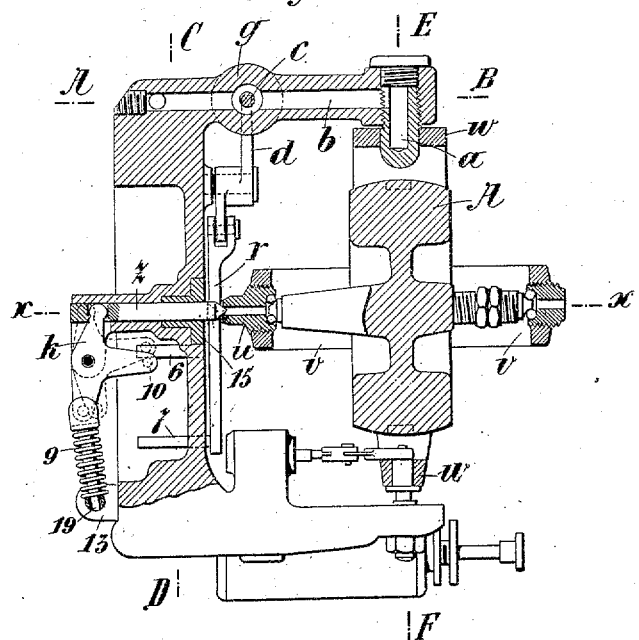
Figure 2:
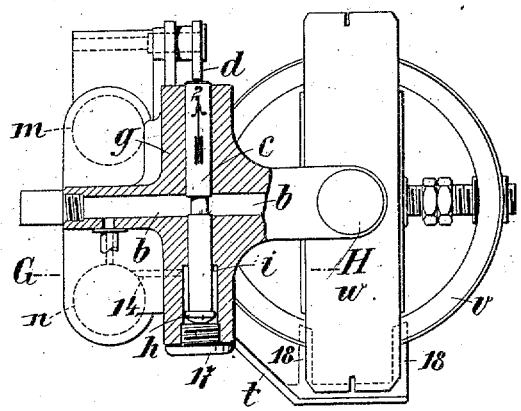
Figure 3:
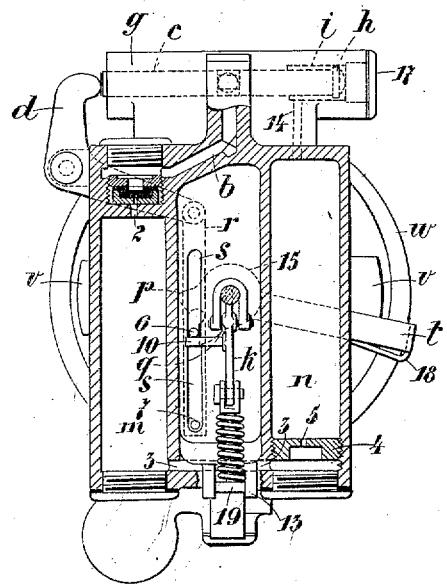
Figure 4:
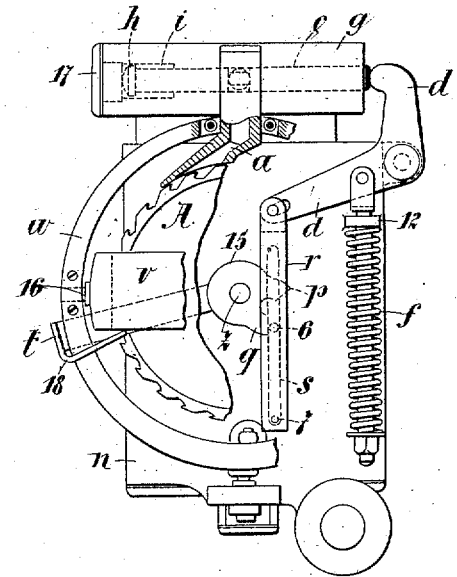
Figure 6:
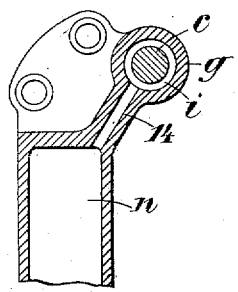
Figure 5:
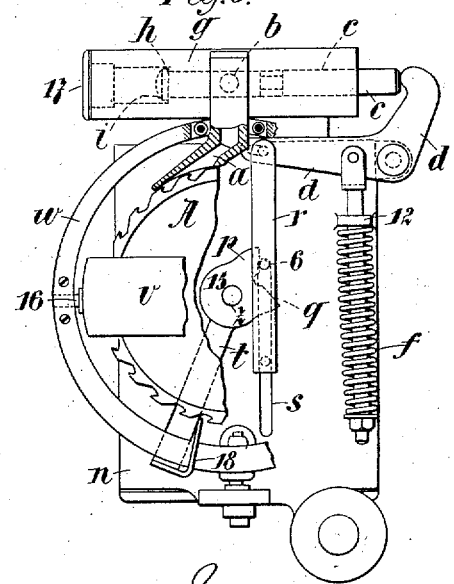

Figure 1 is a vertical section through the axis of the rotating body of a device constructed in accordance with my invention. Fig. 2 a sectional plan on line A—B of Fig. 1, Fig. 3 a vertical section on line C—D of Fig. 1 as seen from the left. Fig. 4 a vertical section on line E—F of Fig. 1 as seen from the right showing the members in operative position. Fig. 5 is a section similar to Fig. 4 in which the members are shown in a position of rest. Fig. 6 is a detached section on line G—H of Fig. 2.

In carrying out my invention and referring to the figures generally I employ in the channel $b$ leading to the air nozzle $a$ of the turbine drive, a piston valve $c$ which in the position shown in Fig. 2 opens the air channel $b$ and when axially displaced brings its solid part in front of the air channel and thereby cuts it off. The free end of the valve $c$ is acted upon by an angular lever $d$ placed under the influence of a spring $f$ supported by a projection 12 on the casing which thus tends to force the valve $c$ in the casing $g$ to abut against the screwed plug 17; in this end position the valve is opened. This tendency is counteracted by the compressed air acting upon the back of the valve $c$.

In order to permit the compressed air to act upon the back of the valve $c$ after a controllable lapse of time, that is to say, to enter the part $i$ of the valve casing $g$, this part $i$ is not directly connected with the compressed air channel $b$ but indirectly by the insertion of two chambers $m$, $n$; by means of a narrow channel 2 furnished with a sieve to prevent clogging, the chamber $m$ is in communication with the air channel $b$ while the chamber $n$ on the one hand is in communication by means of the channel 3 and a small hole 5 in the lid 4 with the cylinder $m$ and on the other hand by means of the channel 14 (see Fig. 6) with the cut off part $i$ of the valve casing in which the enlarged head $h$ of the valve $c$ slides. Owing to the said arrangement the valve $c$ will remain in the open position while the pressure of the spring $f$ exceeds the counter pressure of the compressed air in the cut off part $i$ and will be closed when the pressure in the latter exceeds the pressure of the spring. The setting of the members which bring and retain the gyroscopic system in normal position as well as for the return to their inoperative position, takes place also by the combined action of the pressure of the spring $f$ and the compressed air upon the valve head $h$. As described in specifications belonging to Letters Patent granted to Ludwig Obry No. 562235 and to A. E. Jones No. 621364 the setting and retaining members of the said ring system consist of an axially displaceable center pin $z$ which enters a boss $u$ rigidly secured to the horizontal ring $v$ in the continuation of the axis $x$ of the rotary body A and also of an oscillating fork $t$ the boss 15 of which is mounted in the casing wall concentrically to the center pin $z$ and the prongs 18 of which in a raised position sharply embrace the rectangular section of the vertical ring $w$ when in a position approximately 90 degrees distant from its axis and thus lie below two places of the horizontal ring $v$ situated at both sides of the pivot 16 of the said ring, whereby both rings $v$ and $w$ are brought into and retained in their normal position; in the bottom position the prongs 18 of the fork $t$ lie around a reduced part of the vertical ring $w$ situated near the axis of rotation and therefore in this position perfectly release both the rings $v, w$.

The center pin $z$ is actuated by the upper arm of a T like or three armed lever $k$ the middle arm of which carries a crank pin 10 while against the lower arm presses a spring 9 bearing against a projection 13 rigid on the frame and furnished with a spring steadying stud 19.

The fork $t$ is actuated by the aid of two cams $p$, $q$ secured to its boss at approximately a right angle and that of a carrier 6 (hereinafter described) movable between these two cams which according to whether it slides on the inside of the upper or lower part of the two cams lowers or raises the fork $t$.

The members $z$ and $t$ are actuated by the angular lever $d$ which is under the combined action of the pressure of the spring and the compressed air in the following manner: To the downwardly pointing arm of the angular lever $d$ is pivoted a slide rod $r$ which carries two horizontal carriers 6 and 7 by the aid of which it is guided in the vertical slot $s$ of the casing wall and which on the one hand acts upon the crank pin 10 of the armed lever $k$ of the center pin $z$ and on the other hand against the cams $p$, $q$ which are on the boss of the fork $t$. Before launching, the lever $d$ and the valve $c$ under the sole influence of the spring $f$, will take up the positions shown in Figs. 2 and 4, in which the air inlet to turbine nozzle is open and the rod $r$ together with the carriers 6 and 7 will be drawn down. Due to this position of the member 6, the fork $t$ and the center pin $z$ are retained in their operative position whereby the gyroscopic system is maintained in its normal position. At the moment of launching, that is to say, when opening the air lever, the compressed air enters through the opened valve $c$, the turbine nozzle $a$ and sets the rotary body of fly wheel A into rapid rotation.

In accordance with the cross sectional area of the channels 2, 3, 5, 14 air will enter the chamber $m$ from the latter pass into the cut off part $i$ of the valve casing in which the air pressure gradually increases according to entrance of the air and finally will reach such a height that the pressure acting upon the head $h$ of the valve $c$ will exceed that of the spring $f$ which causes the valve $c$ to be forced forward in the direction of the arrow 2 until its head $h$ abuts against the casing projection $i$ and will be closed. The movement of the valve turns the lever $d$, the slide rod $r$ together with the carriers 6 and 7, are raised, the carrier 6 acting against the underside of the upper cam, sets it vertically and thereby causes the fork $t$ to move down, after which the lower carrier abuts from below against the crank pin 10 and thereby throws the three armed lever $k$ under the influence of its spring 9, into the end position shown in Fig. 1 in dotted lines, in which the center pin $z$ is withdrawn from the boss $u$. By means of this dual action of the member $r$ the gyroscopic system will be perfectly released.

If torpedoes are simply launched for examination or practice the back of the valve $c$ will be relieved from pressure after the air vessel has been emptied and the same will be returned again to its open position by the spring $f$ only; the carrier 6 of the slide rod $z$ acts upon the lower cam $q$ of the fork $t$ and raises the latter whereby the two rings $v$ and $w$ are turned into their normal position after which near the end of the stroke the said carrier pressing from above against the middle arm of the lever $k$ under the influence of its spring $g$, will throw the latter into the position shown in Fig. 1 in full lines, so that the center pin $z$ will enter the boss $u$ of the horizontal axis of the rotary body and will again retain the latter in its normal position.

Having now particularly described and ascertained the nature of my said invention and in what manner the same is to be performed I declare that what I claim is:

1. In a gryoscope steering gear for torpedoes in which the rotary body is driven by compressed air, the combination of the locking members of the rotary body of the gyroscope, with a cut off piston valve inserted into the compressed air conduit of the driving nozzle, a compressed air conduit to the closed rear part of the valve casing and a spring actuated lever, acting against the free end of said piston all substantially as and for the purpose set forth.

2. In a gyroscope steering gear for torpedoes in which the rotary body is driven by compressed air, the combination of the locking members of the rotary body of the gyroscope, with a cut off piston valve inserted into the compressed air conduit of the driving nozzle, a compressed air conduit connected to the closed rear part of the valve casing and a spring actuated lever acting against the free end of said piston with two or more chambers inserted between the air conduit leading to the rear part of the said slide valve casing and with narrow channels connecting said chambers all substantially as and for the purpose set forth.

3. In a gyroscope steering gear for torpedoes in which the rotary body is driven by compressed air, the combination of the locking members of the rotary body of the gyroscope, with a cut off piston valve inserted into the compressed air conduit of the driving nozzle, a compressed air conduit connected to the closed rear part of the valve casing and a spring actuated lever acting against the free end of said piston, a rod *r* pivoted to said lever, two horizontal carriers 6 and 7, carried by the said rod, a spring actuated tilting lever, actuated by said carriers, a retaining pin *z* of the horizontal axis of the rotating body operated by said tilting lever, two cams *p*, *q* secured to the axis of said oscillating locking member and operated by the upper of the two carriers, all substantially as and for the purpose set forth.

In testimony whereof I hereunto affix my signature in presence of two witnesses.

ALBERT EDWARD JONES.

Witnesses:
G. ANDREW MORIARTY, Jr.,
MATEO CLEMENTS.